UNITED STATES PATENT OFFICE.

CAMILLE GROLLET, OF PARIS, FRANCE.

PROCESS OF EXTRACTING GOLD FROM ORES, &c.

SPECIFICATION forming part of Letters Patent No. 682,061, dated September 3, 1901.

Application filed March 9, 1900. Serial No. 8,066. (No specimens.)

*To all whom it may concern:*

Be it known that I, CAMILLE GROLLET, a citizen of the Republic of France, residing at Paris, France, have invented certain new and useful Improvements in Processes of Extracting Gold from Ores or Metallurgical Products Containing It, of which the following is a specification, this invention having been patented in France November 30, 1899. (Not yet delivered.)

This invention has for its object a new process for extraction of gold from ores or metallurgical products containing the precious metal either free or in complex combinations, sulfids, sulfo-arsenids, sulfo-antimonids, &c.

This process, which may be termed "chlorobromination," consists in obtaining a solution consisting of gold chlorid and bromid from which the precious metal is directly precipitated.

It is known that chlorin acting on gold transforms it into gold trichlorid very soluble in water, according to the equation $$Au + 3Cl = AuCl_3,$$

and that bromin on its part gives a bromid also soluble in water, $Au + 3Br = AuBr_3$. These reactions are well known and form the basis of a certain number of known processes for treatment of auriferous ores. The process, the property in which is here claimed under the name "chlorobromination," rests upon the joint use of these reactions. In this process the chlorin is produced by one of the known methods in the heart of the ore and in any pugging apparatus. The reagents producing chlorin are introduced at two periods, and so divide the operation into two distinct phases. In the first the chlorin is left to act alone for a time, which varies according to the nature of the ore treated. In the second phase to the reagents for producing chlorin is added a quantity of bromin, which also varies according to the nature of the ore, but which is always so small as to render recovery of the reagent useless. This recovery might always, however, be effected if economical considerations should render it advantageous—for instance, in case of mines far from any means of communication. It is to be understood that the bromin may be introduced either as bromin or in the state of any compound capable of yielding bromin by its decomposition under the influence of suitable reagents. Roasting is not necessary in the case of pure ores; but it is necessary in the case of sulfid, antimonid, arsenid, &c., ores, and for these the treatment is as follows:

First. The ore is roasted in such a manner as to avoid as much as possible formation of sulfates, arseniates, &c., as these salts might be decomposed by an attack of bright-red heat at the end of the operation. There is thus obtained a mixture of gangue, oxids of the inferior metals, and metallic gold. In the treatment by chlorobromination this gold is transformed into gold chlorid and bromid, while the metallic oxids are scarcely or not at all attacked.

Second. The roasted ore is then introduced into any rotating vessel provided with agitators, where it is subjected to the chlorobromination treatment indicated above.

Third. The action on the gold being completed, the material is put in a filter and methodically washed with water, so as to extract completely from it the gold chlorid and bromid.

Fourth. The filtered liquid is then drawn into apparatus for precipitation.

Fifth. The gold is precipitated by any process, preferably by sulfurous anhydrid and sulfureted hydrogen.

In order to trace clearly the reactions which take place, assume that there is a complex ore composed of mispikkel, (arsenio sulfid of iron,) of chalcopyrites, (double sulfid of copper and iron,) of stibine, (antimony sulfid,) of iron pyrites, (iron sulfid,) of blende, (zinc sulfid,) and of galena, (lead sulfid.) All these sulfids during the roasting produce sulfurous anhydrid and oxids. With the mispikkel there are also produced iron peroxid and arsenious acid, $$2FeAsS + 10O = Fe_2O_3 + As_2O_3 + 2SO_2.$$

The chalcopyrites give iron peroxid and copper oxid, $$2CuFeS_2 + 13O = Fe_2O_3 + 2CuO + 4SO_2.$$

The stibine produces two volatile compounds—sulfurous anhydrid and antimony oxid.

$$Sb_2S_3 + 9O = Sb_2O_3 + 3SO_2.$$

From the pyrites remains iron oxid, $$2FeS_2 + 7O = Fe_2O_3 + 2SO_2.$$

Blende and galena give, respectively, zinc oxid and lead oxid, $$\left.\begin{array}{c}Zn\\Pb\end{array}\right\} S + 3O = \left.\begin{array}{c}Zn\\Pb\end{array}\right\} O + SO_2.$$

It is not exactly known in what state the gold exists in ores. It is always transformed into the metallic state by the roasting. Practically, however, the roasting of a sulfid ore is less simple than the preceding formulas would seem to indicate. Whatever be the precautions taken during the operation there is always produced a certain quantity of antimoniate of antimony, sulfates, and arseniates. The last two are decomposed by bright-red heat at the end of the operation. The other is, for the most part as it is produced drawn to the antimony oxid ($Sb_2O_3$) and condenses with it in the cold parts of the furnace, so that finally there remain iron peroxid, copper oxid, lead oxid, zinc oxid, gold and silver, and all the silica of the ore. After the chlorobromination treatment the iron oxid remains unattacked. The copper, lead, and zinc oxids are attacked; but owing to the dilutions of the liquors this attack is very weak. On washing the small quantities of copper, lead, and zinc chlorid and bromid pass into the liquors along with the gold chlorid and bromid. After the precipitation they remain in solution, if this precipitation is made by ferrous sulfate or oxalic acid. If it is made by sulfureted hydrogen, the copper and lead are precipitated with the gold and are separated from it by refining. Acidulation of the liquor prevents precipitation of the zinc. The silver is transformed into silver chlorid and bromid, insoluble compounds, which remain in the tailings, from which they may be recovered by any process. The advantages resulting from the simultaneous employment of chlorin and bromin consist in obtaining as a consequence of this simultaneous action superior results both in quickness and yield over the separate action of these two bodies.

To sum up, I claim—

A new process of extracting gold from its ores or metallurgical products containing same, consisting in treating these ores or these metallurgical products, previously roasted if they are impure, by the simultaneous action of chlorin and bromin, the chlorin being in such proportion that the excess over that necessary to dissolve the gold is in excess of the bromin employed, said treatment beginning by first producing chlorin within the mass of ore and adding bromin immediately after, then filtering and washing the material and then precipitating the gold, substantially as described.

In witness whereof I have hereunto set my hand in presence of two witnesses.

CAMILLE GROLLET.

Witnesses:
EDWARD P. MacLEAN,
JULES FAYOLLET.